United States Patent [19]

Wassmann

[11] 4,225,548

[45] Sep. 30, 1980

[54] METHOD FOR PRODUCING DRAWING STENCILS

[75] Inventor: Edgar Wassmann, Hamburg, Fed. Rep. of Germany

[73] Assignee: Mesne Koh-I-Noor Rapidograph, Inc., Bloomsbury, N.J.

[21] Appl. No.: 950,643

[22] Filed: Oct. 11, 1978

[30] Foreign Application Priority Data

Oct. 18, 1977 [DE] Fed. Rep. of Germany ....... 2746741

[51] Int. Cl.3 ................................................ B29C 6/04

[52] U.S. Cl. .................................... 264/130; 264/264; 264/274; 264/275

[58] Field of Search ............... 264/130, 264, 273, 274, 264/249, 252, 242

[56] References Cited

U.S. PATENT DOCUMENTS

| | | | |
|---|---|---|---|
| 2,364,512 | 12/1944 | Bower | 264/264 |
| 3,228,686 | 1/1966 | Faulkner, 3rd | 264/273 |
| 3,247,550 | 4/1966 | Haines, Jr. | 264/274 |
| 3,415,709 | 12/1968 | Santangelo | 264/274 |
| 3,591,669 | 7/1971 | Membry | 264/242 |
| 4,011,819 | 3/1977 | Kessler | 264/274 |
| 4,091,068 | 5/1978 | Karas | 264/274 |
| 4,093,249 | 6/1978 | Chambers | 264/274 |

FOREIGN PATENT DOCUMENTS

| | | | |
|---|---|---|---|
| 7630452 | 9/1976 | Fed. Rep. of Germany . | |
| 1104477 | 11/1955 | France | 264/274 |

OTHER PUBLICATIONS

*Plastics Engineering Handbook,* third ed., Reinhold Publishing Corp., New York, 1960, pp. 347, 348, 353, 354.

*Primary Examiner*—James B. Lowe
*Attorney, Agent, or Firm*—David H. Semmes; Warren E. Olsen

[57] ABSTRACT

A process for producing a drawing stencil characterized in that a plastic border edging is applied, by a spray or injection molding, upon a preformed stencil sheet. A further feature disclosed is the use of a lubricated interface between a border edging and a stencil sheet, to relieve stress buildup and resultant distortion of the stencil.

4 Claims, 2 Drawing Figures

METHOD FOR PRODUCING DRAWING STENCILS

BACKGROUND OF THE INVENTION

1. Field of the Invention

The invention refers to a procedure for the production of writing or drawing stencils, and particularly to a stencil plate consisting of plastic and a border edging of plastic bound to the stencil sheet.

2. Description of the Prior Art

It is already well known how to produce the stencil plate and the border edging of a writing or drawing stencil in one piece, through injection molding (DT Gbm 76 30 452 ). Considerable difficulties arise from this process, and these difficulties can be traced back to the fact that the material strength of the total stencil sheet produced varies greatly. During the injection molding process, the border edging, consisting of greater masses of material, cools off slower after the injection molding than does the stencil plate which has less material strength. This can lead to considerable tension and molding flaws in the stencil plate. Beyond that, the tension can cause distortion of the stencil place, requiring reworking of the drawing surfaces of the border edging to correct. This type of re-working is particularly necessary if the symbol grooves in the stencil plate are produced simultaneously with the injecting of the entire stencil, since only then is the necessary precision achieved when the stencil is reversed, i.e., the distances between the writing edge and the reference line for the symbol grooves are exactly the same.

Furthermore, another procedure has already been recognized (DT-GM 76 30 452 ) wherein border edging of plastic (instead of the usual metal border edging) is slipped onto a prepared stencil plate, and secured thereon, for example, by meshing with indentations or protrusions present in the stencil plate. In order to achieve the desired precision when reversing, it is necessary with this procedure to rework the injection molded plastic border edging, and occasionally the stencil must be redone, also.

In another recognized procedure (DT-AS 12 37 927 ), metal border edges are inserted into an injection mold and the stencil plate is then molded in plastic. The plastic fills up the spaces in the metal border edging, thus producing a bond between stencil plate and border edging. Not even considering the fact that the above mentioned recognized procedure is plagued by difficulties arising as a result of the differing rates of cooling previously discussed, stencil plates produced in that procedure have the further disadvantage of distorting as a result of tensions which can occur in use and arise out of the different temperature coefficients of the plastic in the stencil plate and the firmly attached border edging. Besides that, the finishing of such metal border edging is relatively costly.

BRIEF SUMMARY OF THE INVENTION

The corresponding object of this invention is to provide a simple and economical procedure for the production of writing or drawing stencils, through which stencils can be produced which exhibit no internal tension arising from differential cooling rates and stencils which require no reworking to achieve the necessary reverse accuracy.

In realization of this object, the procedure of the present invention employs a border edging that is sprayed onto a pre-prepared stencil plate. It is additionally preferred that a stencil plate, in which the symbol grooves may have been either etched or formed during an injection molding, be placed into a precisely defined position in an injection mold (where the border edging is sprayed on) by means of positioning holes or positioning protrusions formed right on the stencil plate.

In the procedure according to the invention, plastic border edging is sprayed onto a pre-prepared plastic stencil plate. Since only the border edging has to cool after this spray-molding, and since the edging has essentially the same cross-sectional dimensions along its entire length, there is no variance in the cooling rate of the material of which the stencil is made. Hence, no resulting internal tension arises to cause distortion of the stencil. Further, it is preferred that the same type of plastic be used to produce both the stencil plate and the edging so that the stencil plate and the edging possess the same temperature coefficient. Temperature changes, therefore, will cause practically no distortion.

The positioning holes or protrusions make it possible to position the stencil plate very precisely within an injection mold form. Moreover, even if the position of the lateral edge of the stencil plate varies somewhat relative to the positioning holes or protrusions, it is still possible to produce a stencil with great reverse-accuracy by spraying on the edging in the injection mold form. Possible deviations of the previously mentioned relative positioning are compensated for through the spraying on the edging.

Although a writing or drawing stencil, according to the present invention, consists of a stencil plate and border edging which normally consist of the same plastic and thereby have the same temperature coefficient, temporary distortions of the stencil can yet arise due to ambient temperature changes. This is possible since the stencil plate will react to temperature changes more rapidly, due to its lower material strength. The border edging reacts less rapidly as a result of its greater material strength.

A stencil plate having slots running lengthwise in its border area can be used to eliminate these temporary distortions. In the procedure according to the invention, a border edging is attached to the stencil plate, as is the established case with writing stencils, to engage with slots thereon. Further, the border areas can be coated with a separation substance, or lubricant, in a stencil plate preparation step which is done prior to spraying on the edging. This step prohibits adhesion or binding of the edging to the stencil plate, so that the edging can be slid lengthwise along the stencil plate. Perpendicular movement of the edging, i.e., away from the stencil plate, is prohibited by the slots running longitudinally along the stencil plate. To prohibit the edging from sliding longitudinally along the stencil plate, the two can be firmly attached at one point, i.e., in a very small area.

According to this aspect of the present invention, a separation of the stencil plate from the border edging, i.e., by an attachment in a very small area, lessens the likelihood that distortion of writing or drawing stencils will occur, since the two elements are allowed to expand independently of one another in the event of temperature changes.

To facilitate the use of the writing or drawing stencil produced according to the present invention, indentations can also be made in the contact areas of the border edging, and/or in the areas just inside the contact areas, in order to allow the user to establish and maintain a reliable and secure grip.

In addition, the coating in one of the identations in the border edging can be so fashioned that it no longer stands out as far on the finished stencil as has been the case with many other stencils.

Other features and advantages of the present invention will become apparent from the following description of a preferred embodiment, wherein reference is made to the accompanying drawings.

DESCRIPTION OF THE PREFERRED EMBODIMENT

Figure 2:
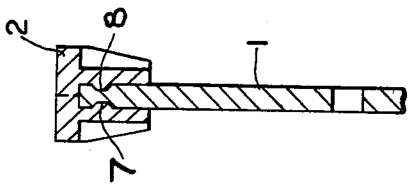
FIG. 2 is a magnified cross section taken along the line II—II of FIG. 1.
Figure 1:
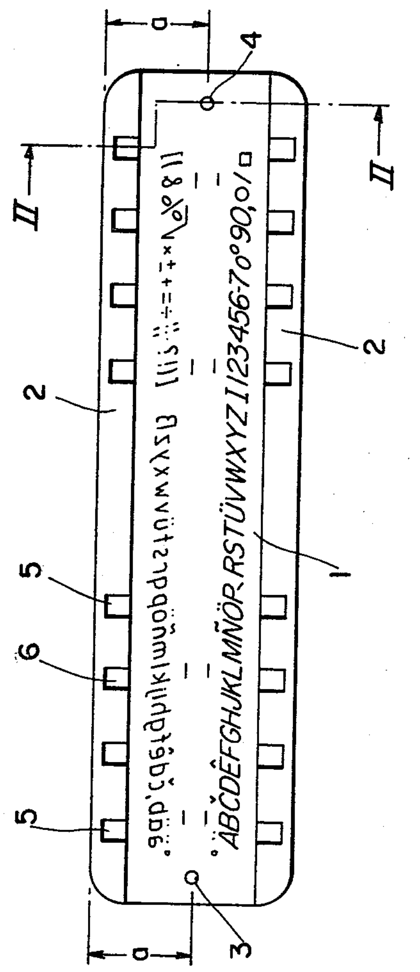
FIG. 1 shows a top view of a writing stencil produced according to the procedure of the present invention.

The writing stencil depicted in FIGS. 1 and 2 exhibits a stencil plate, 1, having the usual symbol grooves, two positioning holes, 3 and 4, and longitudinal slots, 7 and 8, in the border area.

To produce the depicted writing stencil, the border areas of the stencil plate 1, to be covered by border edging, are coated with a separation substance, or lubricant, and then the stencil is placed in an injection mold form, where it is precisely aligned by means of the positioning holes, 3 and 4.

After the injection mold form is closed, the border edging 2 is sprayed on and the indentation 5 are simultaneously formed. During the spraying, the material of the border edging also fills up the border edging slots, 7, 8, so that the resulting border edging 2 cannot be pulled transversely with respect to its longitudinal alignment in relation to the stencil plate 1. The edging, however, remains moveable in a longitudinal direction due to the fact that the lubricated interface prevents a firm attachment to the stencil plate, unless, of course, the edging 2 and stencil plate 1 are firmly attached to each other at a certain point or in a certain small area (not depicted).

Since the distance between the positioning holes 3, 4, and the contact edge of the edging 2, "a", as shown in FIG. 1, is determined only by the injection mold form, this distance and thus the reverse precision of the stencil, can be kept within small tolerances without necessitating any reworking of the stencil.

Finally, it should be noted that a coating 6 is shown located in an indentation 5 of the border edging 2 and is, therefore, hardly recognizable on the finished stencil.

As has already been mentioned, the stencil plate 1 and the border edging should preferably be produced from the same plastic. Types of plastic which lend themselves to this application are, for example, cellulose-acetobutyrate, cellulose propionate or, particularly, polycarbonate. Furthermore, it is possible to dye the plastic used for the border edging so that the edging is optically distinguishable from the stencil plate.

While I have illustrated my invention with a preferred embodiment, it is to be understood that the invention is to be defined by the scope of the appended claims.

I claim:

1. In a process for producing writing and drawing stencils of the type wherein a stencil plate is comprised of a plastic material and there is a border edge bound upon at least on edge of said plate, the improvement which comprises forming said border edging by injection molding a plastic material onto said at least one edge of a stencil plate which has been pre-formed, and placed in a precisely defined position, with respect to an injection mold, wherein said injection molding step is accomplished by means of positioning elements pre-formed within said stencil plate, wherein further the template sheet is provided with slots running lengthwise along the border areas upon which said border edging is to be molded, and characterized further by the fact that the stencil plate border areas are coated with a lubricating material before a border edging of the same plastic material is molded thereon.

2. The improved process according of claim 1 wherein said lubricating material is silicone oil.

3. The improved process according to any of claims 1 or 2, wherein further the injection molded border edging includes indentations which are formed in the vicinity of the contact surfaces of the border edging.

4. The improved process according to claim 3 wherein further a coating is applied upon at least one of the indentations formed within said injection molded border edging.

* * * * *